United States Patent [19]

Schoenmeyr

[11] 4,281,839

[45] Aug. 4, 1981

[54] ROTARY FACE SEALING APPARATUS

[75] Inventor: Ivar L. Schoenmeyr, Laguna Niguel, Calif.

[73] Assignee: Purex Corporation, Lakewood, Calif.

[21] Appl. No.: 30,292

[22] Filed: Apr. 16, 1979

[51] Int. Cl.³ .................... F16N 17/04; F16J 15/34
[52] U.S. Cl. .................... 277/93 SD; 277/96.2
[58] Field of Search .................... 277/93 SD, 96.2

[56] References Cited

U.S. PATENT DOCUMENTS

| 3,837,659 | 9/1974 | Moncrief | 277/93 SD |
| 4,036,505 | 7/1977 | Floyd et al. | 277/96.2 |

FOREIGN PATENT DOCUMENTS 1929323  12/1970  Fed. Rep. of Germany ...... 277/93 SD

*Primary Examiner*—Robert I. Smith
*Attorney, Agent, or Firm*—William W. Haefliger

[57] ABSTRACT

Rotary sealing apparatus for sealing off between a relatively rotating shaft having an axis of rotation and mounting an impeller, and a relatively non-rotating wall through which the shaft extends, there being an annular seat on the wall, comprises:

(a) a non-metallic seal ring extending about the shaft and engaging the seat to seal off between the seat and ring,
(b) means located between the impeller and the seal ring to rotate the ring with the shaft, and
(c) a non-metallic annular seal member located between the seal ring and the shaft to seal off therebetween.

9 Claims, 8 Drawing Figures

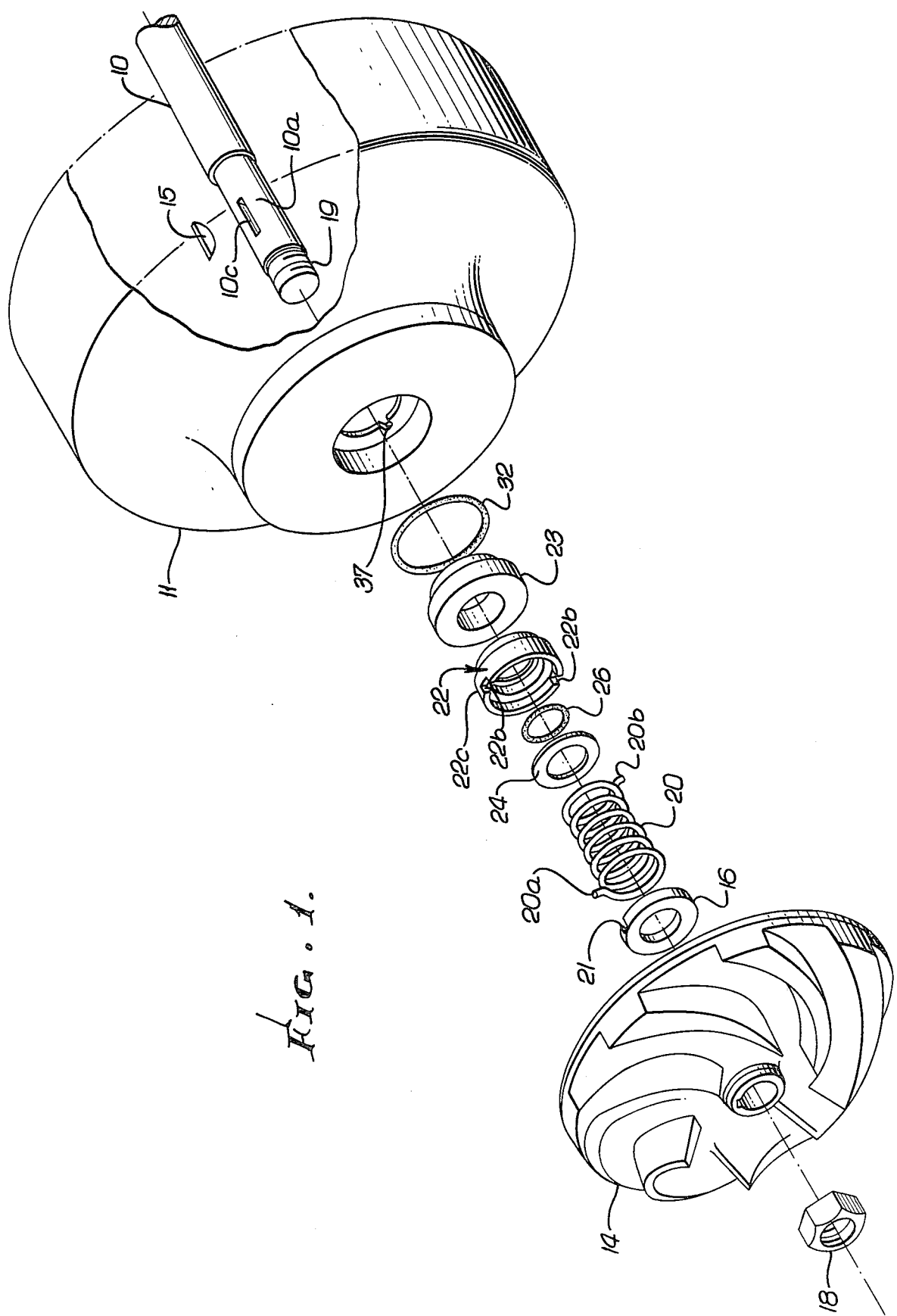

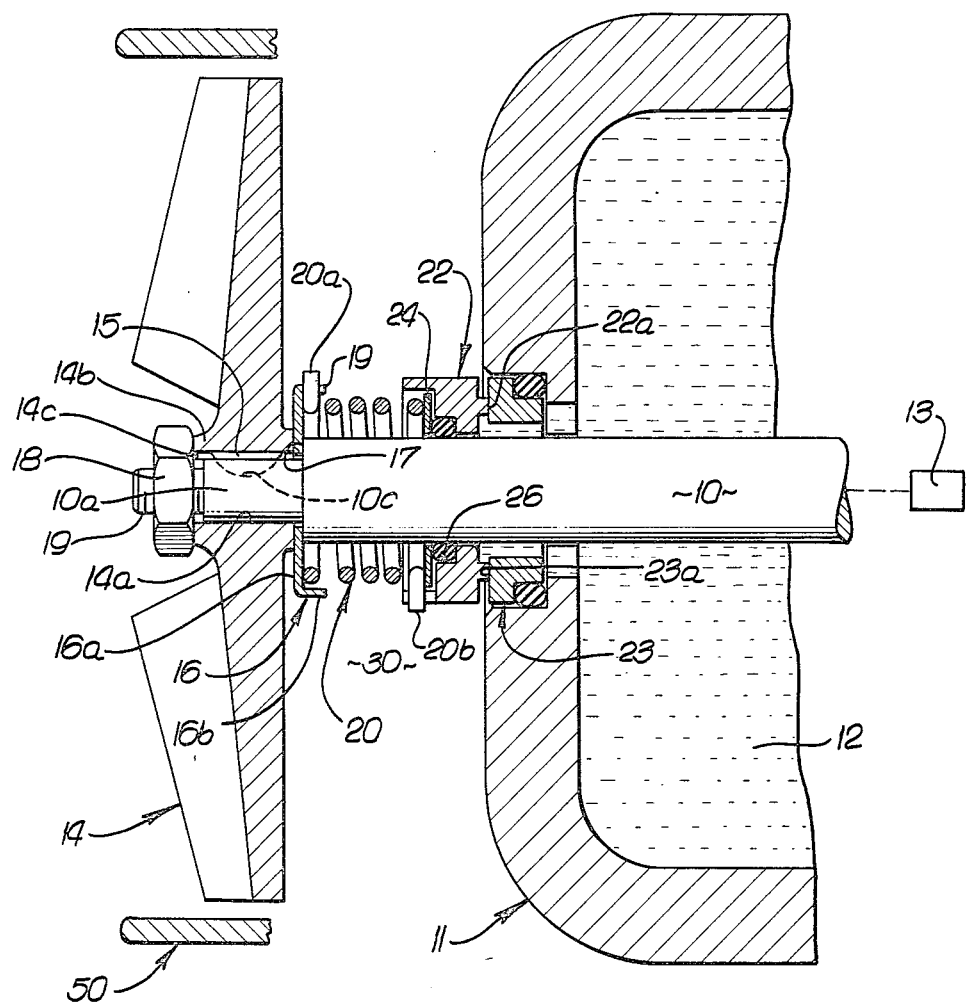
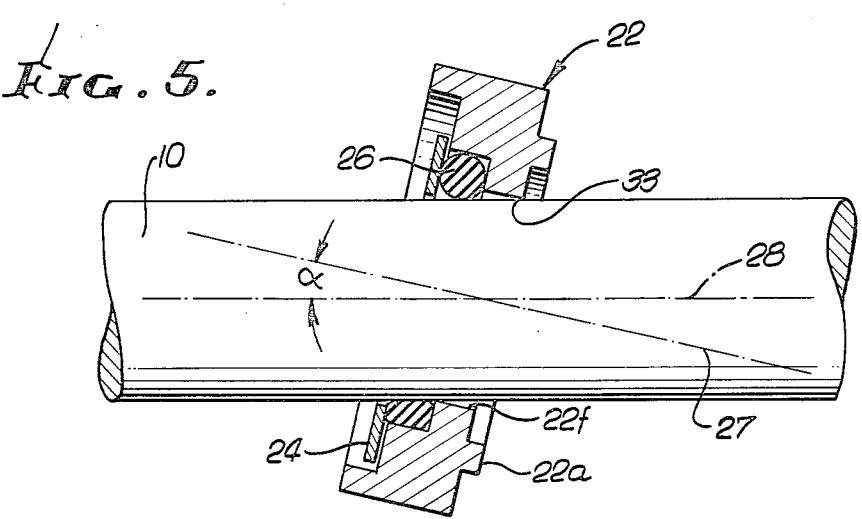

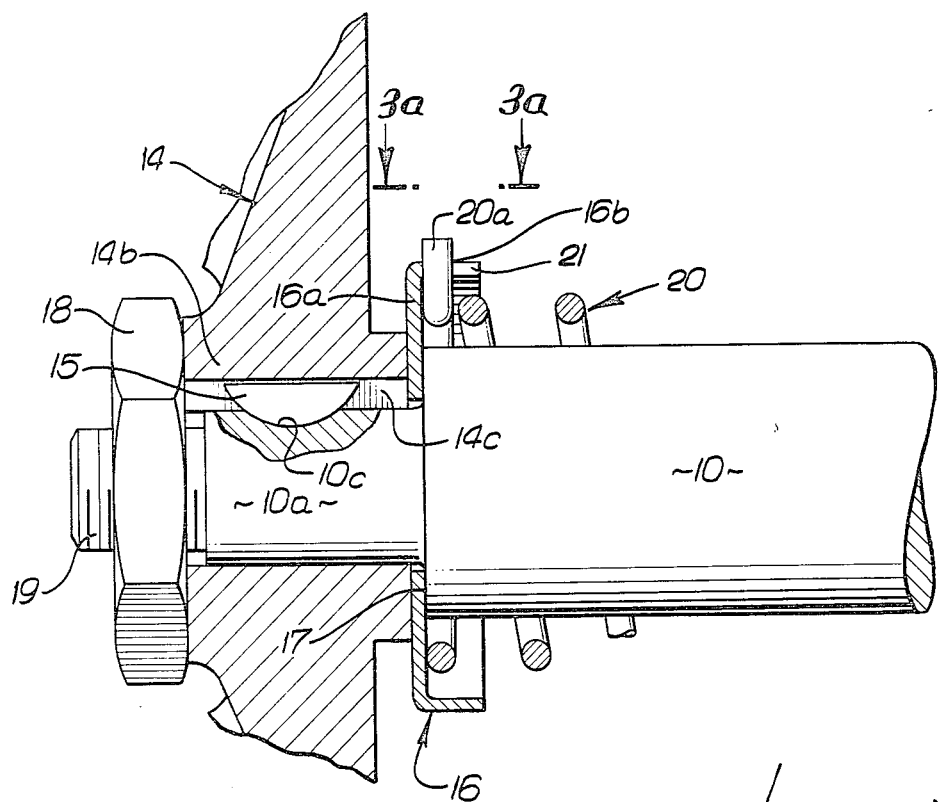
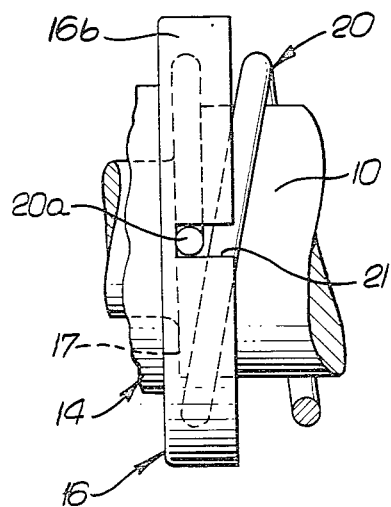
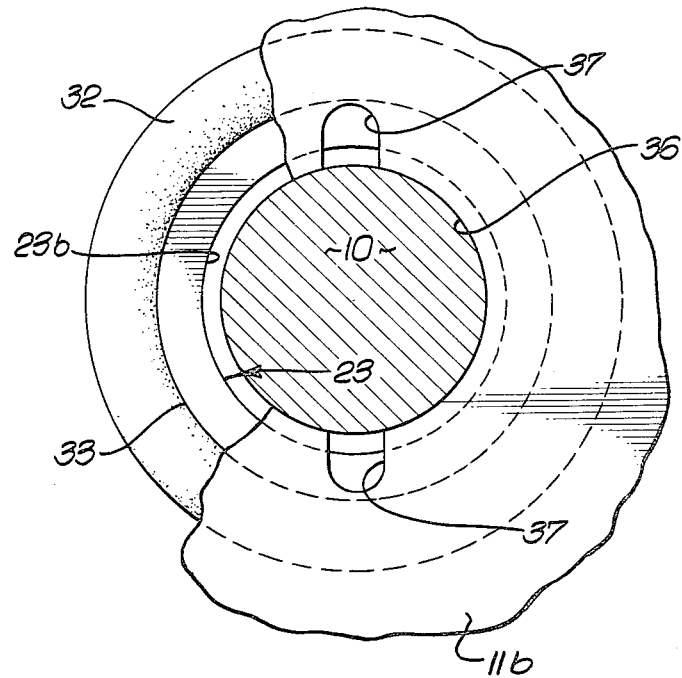

ROTARY FACE SEALING APPARATUS

BACKGROUND OF THE INVENTION

This invention relates generally to relatively moving seal members, and more particularly concerns devices for sealing off between rotary shafts and housings or walls through which shafts projects.

An oil-housing typically has an opening through which a shaft extends. When in operation the shaft rotates and drives an impeller that pumps liquid, and a mechanical face sealing system is required to minimize leakage of liquid into the oil-housing through which the shaft extends, and also to minimize the leakage of oil contained in the oil-housing to the outside. The seal system must be compatible with abrasive and corrosive applications and have inherent self-lubricating qualities in case of dry operation. Its construction must be such that it has a low coefficient of friction and good heat transfer properties so that distortion of the seal ring surfaces is kept to a minimum. In addition, the seal must be self-compensating for minor misalignments between the axis of symmetry of the shaft and the axis of symmetry of the stator.

SUMMARY OF THE INVENTION

It is a major object of the invention to provide a simple seal system of the described type which will meet the above outlined requirements. Basically, the system contemplates provision of an annular seat on a wall through which the impeller carrying shaft projects, and includes (a) an annular ceramic seal ring extending about the shaft and engaging the seat to seal off between the seat and ring, (b) means located between the impeller and the seal ring to rotate the ring with the shaft, and (c) a non-metallic annular seal member located between the seal ring and the shaft to seal off therebetween.

As will be seen, the seal ring is typically radially spaced from and about the shaft to allow relative pivoting of the shaft and seal ring without compromising the sealing function of the ring; the means to rotate the seal ring advantageously includes a compression spring endwise confined between the impeller and the seal ring to urge the latter against the seat, one end of the coil spring attached to a cupwasher clamped by the impeller to the shaft, and the opposite end of the spring attached to the seal ring to rotate it as the spring and cupwasher are rotated by the shaft; and an O-ring seals off between the seal ring and shaft in such manner as to allow relative pivoting of the seal ring and shaft.

Further, the seat is typically defined by a seat ring carried by a wall of the oil housing; the seat ring is radially spaced from the shaft to allow oil circulation along the shaft to the seal ring for cooling purposes near the interengaged lapped surfaces of the seal and seat rings; the exterior of the seal ring is exposed to contact by fluid pumped by the impeller for cooling purposes; and another O-ring seals off between the seat ring and the housing, as will appear.

These and other objects and advantages of the invention, as well as the details of an illustrative embodiment, will be more fully understood from the following description and drawings, in which:

DRAWING DESCRIPTION

FIG. 1 is an exploded view of the sealing system;

FIG. 2 is an axial section, in elevation, through the system;

FIG. 3 is a fragmentary view, partly in section, showing details;

FIG. 3a is a fragmentary plan view on lines 3a—3a of FIG. 3;

FIG. 4b is a fragmentary end view showing details of the oil housing;

FIG. 4c is a fragmentary axial section showing details of the seal ring and seat, and taken on lines 4c—4c of FIG. 4a; and FIG. 5 is an elevation, partly in section, showing relative misalignment of the shaft and seal ring.

DETAILED DESCRIPTION

Figure 4A:
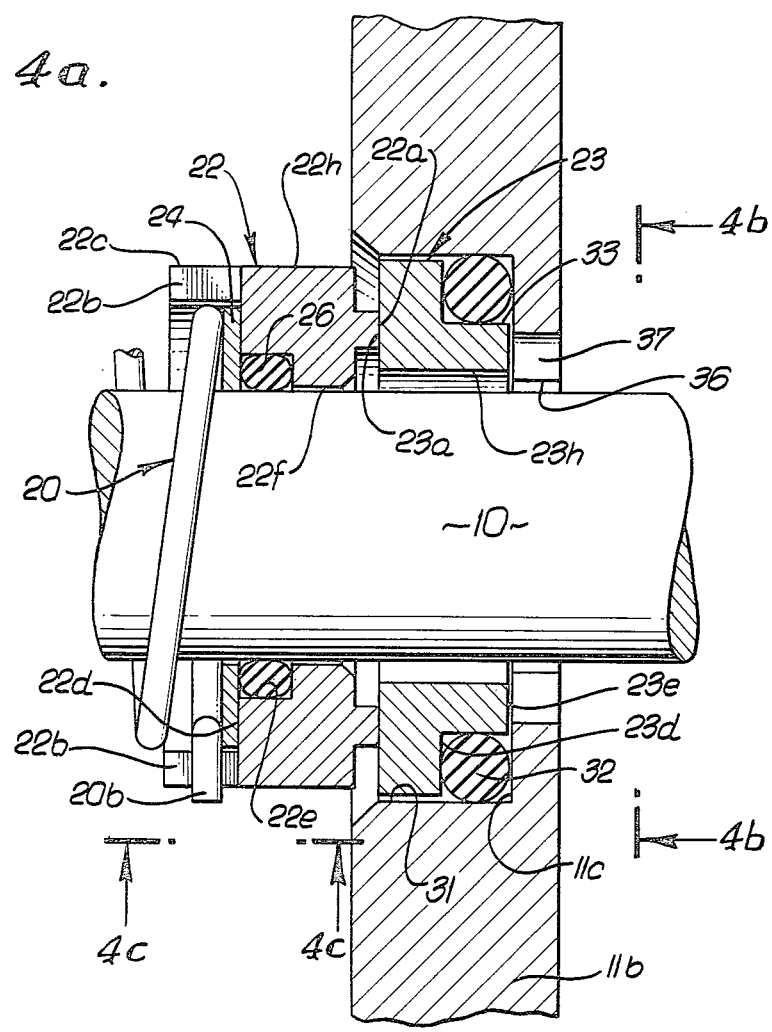
FIG. 4a is a fragmentary elevation, showing details.
Figure 4C:
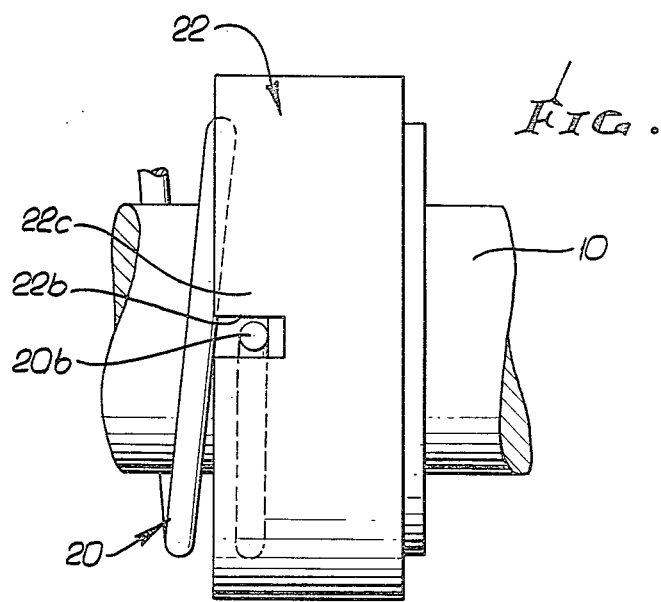

In the drawings, a rotary shaft 10 projects from a housing 11 adapted to contain oil 12. Means to rotate the shaft may be contained within the housing 11, as schematically indicated at 13, and may comprise an electrical motor. The shaft may, for example, comprise the motor shaft.

An impeller 14 is received on the shaft to be rotated therewith. The function of the impeller may be to pump liquids, or displace fluid to cool the housing 11; or it may have other purposes. As shown, the shaft end portion 10a has a reduced diameter onto which the impeller bore 14a is received. A key 15 is received in a shaft groove 10c, and in a keyway 14c formed in the impeller hub 14b, to drive the impeller.

A cupwasher 16 is also received on the shaft end portion, and includes an annular, radially extending base 16a clamped between the impeller hub and a step shoulder 17 on the shaft. A tightening nut 18 received on the shaft end thread 19 clamps the hub 14b toward and against the base 16a. The cupwasher has an annular skirt 16b closely receiving the left end portion of a drive spring 20, which is centered by the cupwasher. The coil spring 20 extends about the shaft 10, in spaced relation thereof, and has a radially extending tang 20a received in an axial slot 21 in the skirt 16b, whereby rotation of the cupwasher by the shaft serves to rotate the spring with the shaft.

As best seen in FIGS. 2 and 4a, an annular ceramic seal ring 22 also extends about the shaft 10 and has an axially rightwardly facing annular boss surface 22a that engages the left annular face 23a of a seat ring 23. The latter is typically non-rotary relative to housing 11, whereas seal ring 22 is rotary, i.e. rotates with shaft 10. In this regard, the drive spring 20 is typically a compression spring configured to urge the seal ring toward the seat ring with a resultant loading of interengaged surfaces 22a and 23a between about 25–35 psi. The spring wire diameter is also sufficient to enable torque transmission to rotate the seal ring. A tang 20b on the right end of the spring is received in an axial slot 22b in a leftward extending annular skirt portion 22c of the seal ring, whereby the spring rotates or drives the seal ring. Skirt portion 22c also centers the rightward end of the spring.

An annular flat washer 24 is also received within that skirt and against leftward facing wall 22d of the seal ring, the washer extending radially inwardly toward the shaft to confine an O-ring seal 26 within a bore 22e defined by the seal ring. An inner flange 22f defined by the seal ring is spaced from the washer so that the O-ring 26 is confined between 22f and washer 24. The non-metallic (rubber, for example) O-ring seals off between the shaft and bore 22e, and is compressed therebetween as shown in FIG. 4a. The washer 24 is also interposed between the rightward end of the spring and wall 22d to evenly distribute pressure from the spring.

The seal ring is constructed as one solid piece with seal nose or boss surface 22a lapped flat for flat contact with the face 23a of seat 23. Typically, the inner diameter of the annular seal surface 22a is larger than the inner diameter of the annular seat surface 23a, and the outer diameter of surface 22a is less than the outer diameter of surface 23a, whereby the seal ring nose surface 22a is always contained within the flatly annularly engages the seat surface 23a despite slight axial misalignment of the shaft 10 as it rotates, for annular pressure seal maintenance. Further, the innermost diameter of the seal ring inner flange 22f is slightly larger than the outer diameter of the shaft at that locus but not so large that the O-ring 26 can squeeze through the gap, at pressures less than 200 psi.

The innermost diameter of the seal ring is sized to allow that ring to locate itself with its axis 27 of symmetry deviating at angles $\alpha$ up to 7° from the shaft axis 28 of symmetry (see FIG. 5). Thus, the seal ring can compensate for small misalignments between the shaft axis and that of the seat 23.

The O-ring 26 also acts to center the seal ring relative to and upon the shaft 10, the O-ring in addition acting as a pivot locus for the seal ring as is clear from FIG. 5. In this regard, the rightward end of the drive spring 20 is centered within and by the bore of the skirt 22c, the washer 24 also being centered by that bore. Two diametrically opposed slots 22b are provided in the skirt 22c, and a radial tang 20b on the end of the spring 20 closely fits in either slot, to rotatably drive the seal ring as the spring rotates. The outer surface 22h of the seal ring is directly exposed to fluid 30 pumped by the impeller, for maximum cooling (heat transfer) effect.

FIG. 4a shows that the annular seat 23 is received in an annular bore 31 formed in wall 11b. The bore or inner diameter 23b of the seat is at least 10% larger than the major diameter (at that locus) of the shaft 10, to allow for ample oil or coolant circulation between the shaft and seal, whereby the bores of the seat and seal ring are cooled. Note also that the back side 23e of the seat is directly exposed to circulated coolant. A second O-ring 32 is confined between wall bore 31 and outer diameter 33 of the seat, and also between shoulders 11c and 23d as shown. The O-ring is radially compressed between 31 and 33.

Both the seat and seal ring may advantageously consist of case hardened silicon carbide, on a graphite substrate. The silicon carbide crystals have good resistance to abrasives, and are virtually chemically inert. Graphite particles embedded in the surfaces, particularly at 22a and 23a, impart self-lubricating properties to the seal and allow it to run dry. Surfaces 22a and 23a are lapped, as previously indicated.

The opening in the oil-housing wall 11b through which the shaft extends has an inner diameter or bore 36 approximately 5% larger than the major shaft diameter at that locus. This means that the inner diameter 36 is smaller than the inner diameter or bore 23h of the seat and protects the seat from being crushed by excessive radial movements of the shaft. Two diametrically opposing grooves 37 extend radially outward from bore 36, but do not extend into the O-ring seal area. These grooves allow oil circulation to and from the main oil chamber for cooling and lubrication, and also allow access to back of seat 23 for removal purposes.

An impeller housing about the impeller is indicated at 50 in FIG. 2.

I claim:

1. In rotary sealing apparatus for sealing off between a relatively rotating shaft having an axis of rotation and mounting an impeller, and a relatively non-rotating wall through which the shaft extends, there being an annular seat on the wall, the combination comprising
    (a) a non-metallic seal ring extending about the shaft and engaging the seat to seal off between the seat and ring, the ring having a skirt portion,
    (b) means located between the impeller and the seal ring to rotate the ring with the shaft, said means including
        ($x_1$) a cupwasher clamped onto the shaft by the impeller to rotate therewith, the cupwasher having a skirt,
        ($x_2$) a compression spring endwise confined between the cupwasher and the seal ring, and
        ($x_3$) the spring operatively connected with the cupwasher and the seal ring to positively transmit driving torque from the cupwasher to the seal ring, the spring having a first tang received in a slot in said cupwasher skirt, and a second tang received in a slot in said skirt portion of the seal ring,
    (c) and a non-metallic annular seal member located between the seal ring and the shaft to seal off therebetween,
    (d) the seal ring being everywhere spaced from the shaft to allow the shaft to pivot relative to the seal ring while the annular seal member remains sealing off therebetween,
    (e) and a seat ring defining said seat, the seat ring carried by said wall, the seat ring defining an annular notch, and an O-ring in said notch and sealing off between the seat ring and said wall,
    (f) the cupwasher extending between the impeller and a shoulder defined by the shaft to be clamped therebetween whereby positive drive is always transmitted from the impeller to the seal ring while the impeller holds the spring axially compressed to urge the seal ring against the seat,
    (g) the wall having a bore through which the shaft extends, and the seat ring having a bore, the diameter of the wall bore being smaller than the bore diameter of the seat ring, the wall bore being at the side of the seat ring opposite the seal ring,
    (h) and two radially extending slots defined by said wall and intersecting said wall bore which defines said diameter smaller than the diameter of said seat ring bore, whereby two elongated tools are receivable through said slots to push the seat ring free of said wall,
    (i) the wall defined by a housing containing fluid lubricant which communicates with said seat ring bore and said slots.

2. The combination of claim 1 wherein the seat ring has direct, heat transfer contact with said wall.

3. The combination of claim 2 including fluid pumped by the impeller and in direct heat transfer contact with the seal ring.

4. The combination of claim 3 wherein the seat ring and the seal ring both include material consisting essentially of case hardened silicon carbide.

5. The combination of claim 4 including graphite particles embedded in said material to provide seat and seal ring self-lubrication.

6. The combination of claim 1 including a shaft drive in said housing.

7. The combination of claim 6 including a pump housing about the impeller.

8. The combination of claim 1 wherein the seal ring is ceramic.

9. In rotary sealing apparatus for sealing off between a relatively rotating shaft having an axis of rotation and mounting an impeller, and a relatively non-rotating wall through which the shaft extends, there being an annular seat on the wall, the combination comprising
  (a) a seal ring extending about the shaft and engaging the seat to seal off between the seat and ring,
  (b) means located between the impeller and the seal ring to rotate the ring with the shaft, and
  (c) an annular seal member located between the seal ring and the shaft to seal off therebetween,
  (d) the seal ring being everywhere spaced from the shaft to allow the shaft to pivot relative to the ring while the annular seal member remains sealing off therebetween,
  (e) and a seat ring defining the seat, the seat ring carried by said wall, the seat ring defining an annular notch, and an O-ring in said notch and sealing off between the seat ring and said wall,
  (f) said (b) means including a cupwasher connected to the impeller, and a compression spring having a first tang at one end interfitting the cupwasher and a second tang at the opposite end of the spring interfitting the seal ring whereby positive drive is always transmitted from the impeller to the seal ring while the impeller holds the spring axially compressed to urge the seal ring against the seat.

* * * * *